H. W. REYNOLDS.
CREAM SEPARATOR.
APPLICATION FILED JULY 6, 1908.

929,250.

Patented July 27, 1909.

UNITED STATES PATENT OFFICE.

HOWARD W. REYNOLDS, OF NEW YORK, N. Y.

CREAM-SEPARATOR.

No. 929,250.　　　Specification of Letters Patent.　　　Patented July 27, 1909.

Application filed July 6, 1908. Serial No. 441,965.

*To all whom it may concern:*

Be it known that I, HOWARD W. REYNOLDS, a citizen of the United States of America, residing in the borough of Manhattan, in the county of New York and State of New York, have invented certain new and useful Improvements in Cream-Separators, of which the following is a specification, reference being had therein to the accompanying drawing.

This invention relates to a device for extracting cream from milk bottles, my object being to provide a device which will remove the cream or upper stratum of the liquid contents of a bottle or other receptacle without disturbing the lower stratum.

To this end my invention consists in the peculiar features and combination of parts more fully described hereinafter and pointed out in the claims.

Figure 1:
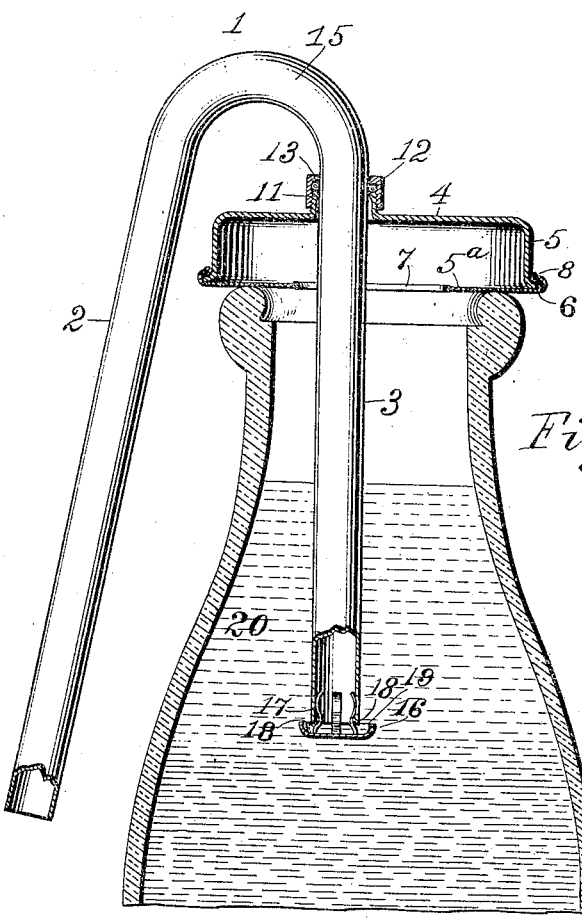
Figure 2:
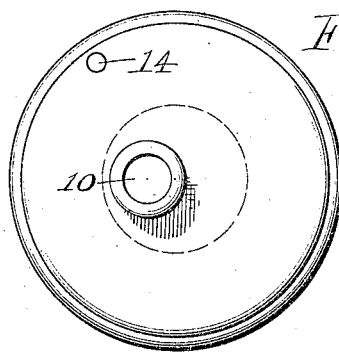
Figure 3:
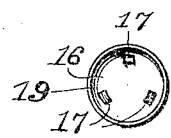

In the accompanying drawings, Figure 1 represents a sectional elevation of my device as applied to an ordinary standard milk bottle, some of the parts being shown in full lines, Fig. 2 is a detail top view of the cap adapted to rest on the top of a bottle, and Fig. 3, a detail view of a deflector for the inner end of a siphon tube.

In removing cream from an ordinary standard milk bottle, such as used for delivering milk from house to house for domestic use, it is often difficult and inconvenient to separate and remove the cream which rises to the top without slopping and losing part of it, or without getting thin milk mixed with it. To overcome these troubles I use a siphon tube 1 having the general outlines of a U-tube and having one leg 2, which, for convenience, we will call the outer leg, inclined outwardly and downwardly to a point below the level of the bottom of the inner leg 3. This inner leg is straight and adapted to stand in a vertical position relative to the milk bottle in which it is to be inserted, and its lower end lies above the lower end of the outer inclined leg, whereby the cream after once being started will continue to flow automatically and by gravity into a cup or other receptacle held under the outer end of the siphon. The means by which the flow of the cream in the tube is started consists of a circular metal cap 4 which acts like a bellows on the air in the bottle. The top of this cap is provided with a circular depending flange 5 provided with a circumferential outwardly projecting lip 6 around its lower edge. This cap is generally made larger than the top of a standard milk bottle to which it is adapted to be applied so that it can be pressed down against the resistance of a circular rubber diaphragm $5^a$ stretched across the bottom or open side of the cap 4 with its edges drawn tightly over the peripheral lip 6. Thus an air-tight joint will be made in the act of pressing the cap down tightly on the bottle to force the cream out. This diaphragm contains a central perforation 7, and the cap together with the diaphragm constitute a cover adapted to rest removably on the rim of the bottle. The outer edge of the rubber diaphragm is provided with a contracting band 8, which when the diaphragm is stretched across the bottom of the flange of the cap, will take over the peripheral lip 6 and hold the diaphragm taut. Said cap is provided with a concentric perforation 10 in order to bring the inner siphon leg closer to the side of the bottle and both legs as closely together as feasible, and at the same time extend the outside leg far enough out to clear the bottle well and allow a cream receptacle to be held under it with greater facility. The straight or inner leg 3 of the tube passes through these two perforations, and is packed against leakage of air by means of an integral upturned sleeve 11 over which a packing gland 12 screws, a packing ring 13 being interposed between the gland and end of the sleeve.

14 is a vent which, when closed by the finger while the separator is applied to a bottle during the depression of the cap, will compress the air already within the bottle, and pneumatically force the cream up the tube and over the bend 15 at the top thereof, and when the finger is removed from the vent the cream will continue to flow automatically out of the bottle as previously stated, leaving only the skim-milk or undesired contents of the bottle behind.

In order to prevent milk instead of cream from being drawn straight up into the mouth of the inner tube, I provide a cup-shaped deflector 16 having a diameter greater than that of the tube. This deflector is held under the mouth of the tube by spring arms 17 fastened to the bottom of the deflector and adapted to enter the tube and to grip the walls to hold it in place. These arms slide up into the tube until shoulders 18 thereon come in contact with the edge of the tube and hold the deflector a sufficient distance away from the mouth to permit the cream to flow in easily. And when thus adjusted on the tube the upturned edge 19 of the deflector will lie in substantially the same horizontal plane with that of the lower end of the tube, so that the cream, which is shown in lighter lines 20, will be drawn in laterally, thence downwardly and upwardly, flowing between the spring-arms in its course.

It is apparent that my device might be varied in many ways that would naturally suggest themselves to a skilled mechanic, therefore I do not limit myself to the exact construction herein shown, but consider myself entitled to all such variations as come within the scope and spirit of my invention.

Having thus described my invention, what I claim as new and desire to secure by Letters Patent, is:

1. In a cream separator for milk bottles and the like, a flanged cap having a vent and being provided with a flexible diaphragm which stretches across the bottom of the flange and is adapted to rest upon the top of the bottle, in combination with a siphon tube which passes tightly through the cap and loosely through the diaphragm.

2. In a cream separator or the like, the combination with a cap having a flexible diaphragm stretched across its lower portion and adapted to loosely rest on the top of a milk bottle, in combination with a siphon tube which passes tightly through and is held by the cap.

3. In a cream separator for milk bottles and the like, the combination with a cap provided with a downwardly hanging flange and having a flexible diaphragm stretched or drawn across the lower portion thereof, and being perforated centrally, and a siphon tube passing tightly through and secured to said cap.

In testimony whereof I affix my signature in presence of two witnesses.

HOWARD W. REYNOLDS.

Witnesses:
 RHESA G. DU BOIS,
 C. B. SCHROEDER.